United States Patent
Ishiguro

(10) Patent No.: US 7,274,987 B2
(45) Date of Patent: Sep. 25, 2007

(54) FUEL AND METHOD FOR EVALUATING FUEL SAVING OPERATION

(75) Inventor: Shinichi Ishiguro, Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 222 days.

(21) Appl. No.: 10/513,411

(22) PCT Filed: Apr. 25, 2003

(86) PCT No.: PCT/JP03/05364

§ 371 (c)(1),
(2), (4) Date: May 13, 2005

(87) PCT Pub. No.: WO03/095821

PCT Pub. Date: Nov. 20, 2003

(65) Prior Publication Data

US 2005/0209771 A1    Sep. 22, 2005

(30) Foreign Application Priority Data

May 10, 2002  (JP) ............................. 2002-134859

(51) Int. Cl.
*G06F 19/00* (2006.01)
*G06G 7/70* (2006.01)

(52) U.S. Cl. ..................... 701/123; 701/30; 701/113; 73/114

(58) Field of Classification Search .............. 701/30, 701/113, 114, 123; 73/114
See application file for complete search history.

(56) References Cited

U.S. PATENT DOCUMENTS

| | | | | |
|---|---|---|---|---|
| 4,385,596 A | * | 5/1983 | Hosaka | 123/682 |
| 4,400,779 A | * | 8/1983 | Kosuge et al. | 701/123 |
| 5,642,284 A | * | 6/1997 | Parupalli et al. | 701/30 |
| 6,453,731 B1 | * | 9/2002 | Yaegashi | 73/113 |
| 6,513,368 B2 | * | 2/2003 | Bondarowicz et al. | 73/53.05 |

FOREIGN PATENT DOCUMENTS

| | | |
|---|---|---|
| JP | 2001-108503 | 4/2001 |
| JP | 2001-349764 | 12/2001 |
| JP | 2003-35191 | 2/2003 |
| JP | 2003-106182 | 4/2003 |
| JP | 2003-106209 | 4/2003 |
| JP | 2003-106210 | 4/2003 |
| JP | 2003-115065 | 4/2003 |

* cited by examiner

*Primary Examiner*—Gertrude A. Jeanglaude
(74) *Attorney, Agent, or Firm*—Rabin & Berdo, P.C.

(57) ABSTRACT

When detecting and recording vehicle data items corresponding to evaluation parameters for fuel-efficient driving (the parameters may include, for example, the speed of the vehicle, the average engine speed during an upshift, or an idle time), it is determined which one of first to N-th preliminarily-set traveling conditions (which may be, for example, highway driving, open-road driving, or idling) a current traveling condition belongs to. The vehicle data items are then recorded according to the determined traveling condition. The amount of fuel consumed in the corresponding traveling condition is also recorded. Each of the vehicle data items of the corresponding traveling condition is given an evaluation score with respect to an evaluation standard. Each evaluation score is then corrected based on a rate of fuel consumption in the corresponding traveling condition. Thus, the evaluation score is corrected in view of the traveling condition. Accordingly, this achieves a proper evaluation for fuel-efficient driving.

11 Claims, 7 Drawing Sheets

PRIOR ART

FIG. 7

| EVALUATION PARAMETERS FOR FUEL-EFFICIENT DRIVING | | IDLE TIME | SPEED ON OPEN-ROAD | UPSHIFT SPEED | CRUISING-GEAR SELECTION | USE OF BRAKE PEDAL | USE OF COMPRESSION RETARDER | USE OF AUXILIARY BRAKE | SPEED ON HIGHWAY | GAS-PEDAL OPERATION ON HIGHWAY |
|---|---|---|---|---|---|---|---|---|---|---|
| IMPORTANCE LEVEL | HIGHWAY DRIVING | | | | | | | | $K_{H1}$ | $K_{H2}$ |
| | OPEN-ROAD DRIVING | | $K_{R1}$ | $K_{R2}$ | $K_{R3}$ | $K_{R4}$ | $K_{R5}$ | $K_{R6}$ | | |
| | IDLING | $K_{I1}$ | | | | | | | | |
| EVALUATION SCORES | HIGHWAY DRIVING | | | | | | | | $D_1$ | $D_2$ |
| | OPEN-ROAD DRIVING | | $E_1$ | $E_2$ | $E_3$ | $E_4$ | $E_5$ | $E_6$ | | |
| | IDLING | $F_1$ | | | | | | | | |

FUEL AND METHOD FOR EVALUATING FUEL SAVING OPERATION

TECHNICAL FIELD

The present invention relates to a fuel-efficient-driving evaluator and a method for evaluating fuel-efficient driving, in which each driving operation of a vehicle is evaluated whether the gas mileage is high or low.

BACKGROUND ART

When comparing vehicles of the same type, the fuel consumption may be different depending on how each vehicle is driven. In other words, the gas mileage may vary depending on how each vehicle is driven. In commercial vehicles, the fuel consumption directly affects the delivery costs, and therefore, in order to reduce the delivery costs, it is necessary to drive in a fuel-efficient manner.

Especially with large-size commercial vehicles, such as large-size trucks, the amount of fuel consumption is large, and since such vehicles are usually driven for long distances, a great amount of fuel can be saved depending on how the vehicle is driven. This can contribute significantly to the reduction of delivery costs. Furthermore, for business organizations having a great number of large-size trucks operating on a daily basis, the delivery costs are greatly affected based on whether each driver drives with a high gas mileage or a low gas mileage.

Accordingly, it is especially demanded that the drivers of large-size vehicles drive in a fuel-efficient manner. There are some evaluation techniques in which various kinds of vehicle data items are recorded so as to evaluate the level of fuel efficiency in each driving operation.

FIG. 6 illustrates an example of a conventional fuel-efficient-driving evaluator. In FIG. 6, reference numeral 1 indicates a vehicle, reference numeral 2 indicates a vehicle control center, reference numeral 3 indicates a vehicle-data detector, reference numeral 4 indicates a storage unit, reference numeral 5 indicates an evaluating unit, reference numeral 6 indicates a totalizing unit, and reference numeral 10 indicates a memory card.

When the vehicle 1 is being driven, the vehicle-data detector 3 detects data for every parameter related to the evaluation for fuel-efficient driving (the parameters may include, for example, the speed of the vehicle, the average engine speed during an upshift, an idle time, and the operation of the gas pedal). The detected data is then stored in the storage unit 4. Such data may be, for example, stored in the memory card 10 inserted in an in-vehicle storage device.

When the driving is finished, the memory card 10 is ejected, and the vehicle data stored therein is input to the evaluating unit 5 in the vehicle control center 2. The evaluating unit 5 is preliminarily provided with an evaluation standard (threshold value, etc.) and procedure for each vehicle data item. Based on the evaluation standard and procedure, each vehicle data item is evaluated and given an evaluation score.

Each evaluation score is sent to the totalizing unit 6 where the final score is calculated. Such calculation may appropriately be performed by, for example, determining the total value of the evaluation scores or the average value of the evaluation scores.

Alternatively, instead of being transferred via the memory card 10, the vehicle data may be directly input to the evaluating unit 5 from the vehicle 1 via a communication network.

According to the conventional art described above, the evaluation is performed without taking into consideration the state of each of the traveling conditions, and for this reason, it is problematic in that the evaluation is not always appropriate in view of fuel-efficient driving.

The following is a further detailed description of why such a problem occurs.

In the conventional art, when calculating the final score from the evaluation scores given based on the vehicle data items corresponding to the parameters for the fuel-efficient-driving evaluation, the scores corresponding to the evaluation parameters that are not significantly related to the fuel-efficient driving and the scores corresponding to the evaluation parameters that are significantly related to the fuel-efficient driving are equally treated to determine the final score (for example, the scores are simply added). For this reason, even when a vehicle is driven in a manner such that the scores corresponding to the evaluation parameters not significantly related to the fuel-efficient driving are high, the final score still becomes high, meaning that the evaluation is not appropriate in view of fuel-efficient driving.

For example, it is assumed that, in a total driving period, 10% of the period is spent idling, 30% is spent driving on open roads, and 60% is spent driving on highways. In such a case, with the conventional approach, the evaluation scores corresponding to the evaluation parameters, such as the idle time, the speed of the vehicle, the average engine speed during an upshift, and the operation of the gas pedal, are given regardless of the percentage of the time spent for each of the traveling conditions. With all of the evaluation scores being treated equally, the final score is calculated.

This means that the evaluation score of the idle time occupying only 10% of the total driving period is treated the same as the evaluation score of the operation of the gas pedal which occupies 60% of the total driving period and which significantly affects the fuel consumption during driving on highways. Accordingly, even if the percentages of the idle time, the open-road driving time, and the highway driving time in the total driving period are different, the evaluation is performed on an equal basis, and is therefore, not appropriate.

On the other hand, the order of the different traveling conditions, such as highway driving, open-road driving, and idling, may be different every trip and may change depending on, for example, the route taken, the weather, the day of the week, or the traffic condition. Consequently, it is not appropriate to change the setting of the evaluation standards and procedures before each trip.

DISCLOSURE OF INVENTION

An object of the present invention is to provide a fuel-efficient-driving evaluator and a method for evaluating fuel-efficient driving that enable proper evaluation for fuel efficiency in a driving operation. In detail, when calculating a final score based on evaluation scores given to vehicle data items corresponding to evaluation parameters for fuel-efficient driving (the parameters may include, for example, the speed of the vehicle, the average engine speed during an upshift, and an idle time), each score is corrected while taking into consideration traveling conditions (such as highway driving, open-road driving, and idling) so that the evaluation for fuel-efficient driving can be performed properly.

In order to carry out the correction process while taking into consideration the traveling conditions, the following steps are performed.

Firstly, when detecting and recording the vehicle data items, it is determined which one of first to N-th preliminarily-set traveling conditions the current traveling condition belongs to. The vehicle data items are recorded according to the corresponding one of the traveling conditions.

Secondly, correction-coefficient calculation data for determining correction coefficients (for example, the amount of fuel consumption, the amount of time spent, or the traveled distance) is recorded according to the corresponding traveling conditions.

Thirdly, each of the vehicle data items of the corresponding traveling condition is given an evaluation, score based on a corresponding evaluation standard. Then, based on the corresponding correction coefficient, (for example, a rate of fuel consumption, a rate of spent time, or a rate of traveled distance in the corresponding traveling condition), each of the evaluation scores is corrected.

In order to achieve the object mentioned above, the present invention according to a first aspect provides a fuel-efficient-driving evaluator which includes a vehicle-data detector for detecting vehicle data items corresponding to evaluation parameters for fuel-efficient driving; a storage unit for storing the vehicle data items; an evaluating unit for evaluating each stored vehicle data item in view of fuel-efficient driving so as to give an evaluation score to the vehicle data item; and a totalizing unit for totalizing the evaluation scores in order to determine total scores. The storage unit, the evaluating unit, and the totalizing unit respectively includes first to N-th storage portions, first to N-th evaluating portions, and first to N-th totalizing portions corresponding to first to N-th preliminarily-set traveling conditions. Moreover, the fuel-efficient-driving evaluator further includes a correction-coefficient providing unit which determines rates of fuel consumption based on the amounts of fuel consumed in the first to N-th traveling conditions and sends the rates as correction coefficients; and a correction totalizing unit which corrects each of the total scores determined by a corresponding one of the first to N-th totalizing portions based on the corresponding correction coefficient and determines a final score.

Furthermore, according to a second aspect, a fuel-efficient-driving evaluator having a similar structure as that of the first aspect is provided. In the fuel-efficient-driving evaluator according to the second aspect, the storage unit and the evaluating unit respectively includes first to N-th storage portions and first to N-th evaluating portions corresponding to first to N-th preliminarily-set traveling conditions. Moreover, the fuel-efficient-driving evaluator is provided with a correction-coefficient providing unit which determines rates of fuel consumption based on the amounts of fuel consumed in the first to N-th traveling conditions and sends the rates as correction coefficients; a correcting unit including first to N-th correcting portions respectively corresponding to the first to N-th preliminarily-set traveling conditions, each of the first to N-th correcting portions of the correcting unit correcting the evaluation scores received from the corresponding evaluating portion based on the corresponding one of the correction coefficients; and a totalizing unit for totalizing the evaluation scores obtained in the first to N-th correcting portions to determine a final score.

Furthermore, the fuel-efficient-driving evaluator according to one of the first and second aspects may further include a timekeeper for measuring the time spent in each of the first to N-th preliminarily-set traveling conditions, the measured time being stored in the storage unit. In this case, each of the rates of fuel consumption determined by the correction-coefficient providing unit is determined based on the time spent in the corresponding one of the first to N-th traveling conditions.

Furthermore, according to a fourth aspect, the present invention provides a method for evaluating fuel-efficient driving by detecting and recording vehicle data items corresponding to evaluation parameters for fuel-efficient driving, giving each of the vehicle data items an evaluation score in view of fuel-efficient driving, and totalizing the evaluation scores so as to determine a final score. The method includes the steps of determining which one of first to N-th preliminarily-set traveling conditions a current traveling condition belongs to; recording the detected vehicle data items and an amount of fuel consumption for the corresponding one of the first to N-th traveling conditions; and correcting the evaluation score of each of the recorded vehicle data items in the corresponding one of the first to N-th traveling conditions based on a rate of fuel consumption for the corresponding one of the first to N-th traveling conditions.

Although the rates of fuel consumption for the traveling conditions are used as correction coefficients in each of the aspects of the present invention, the rates of time spent in the traveling conditions may alternatively be used as the correction coefficients. As a further alternative, the rates of distances traveled in the traveling conditions may be used as the correction coefficients.

BRIEF DESCRIPTION OF THE DRAWINGS

FIG. 7 is a diagram illustrating evaluation scores and importance-level values with respect to vehicle data items and traveling conditions.

BEST MODE FOR CARRYING OUT THE INVENTION

Embodiments of the present invention will now be described with reference to the drawings.

First Embodiment

Figure 2:
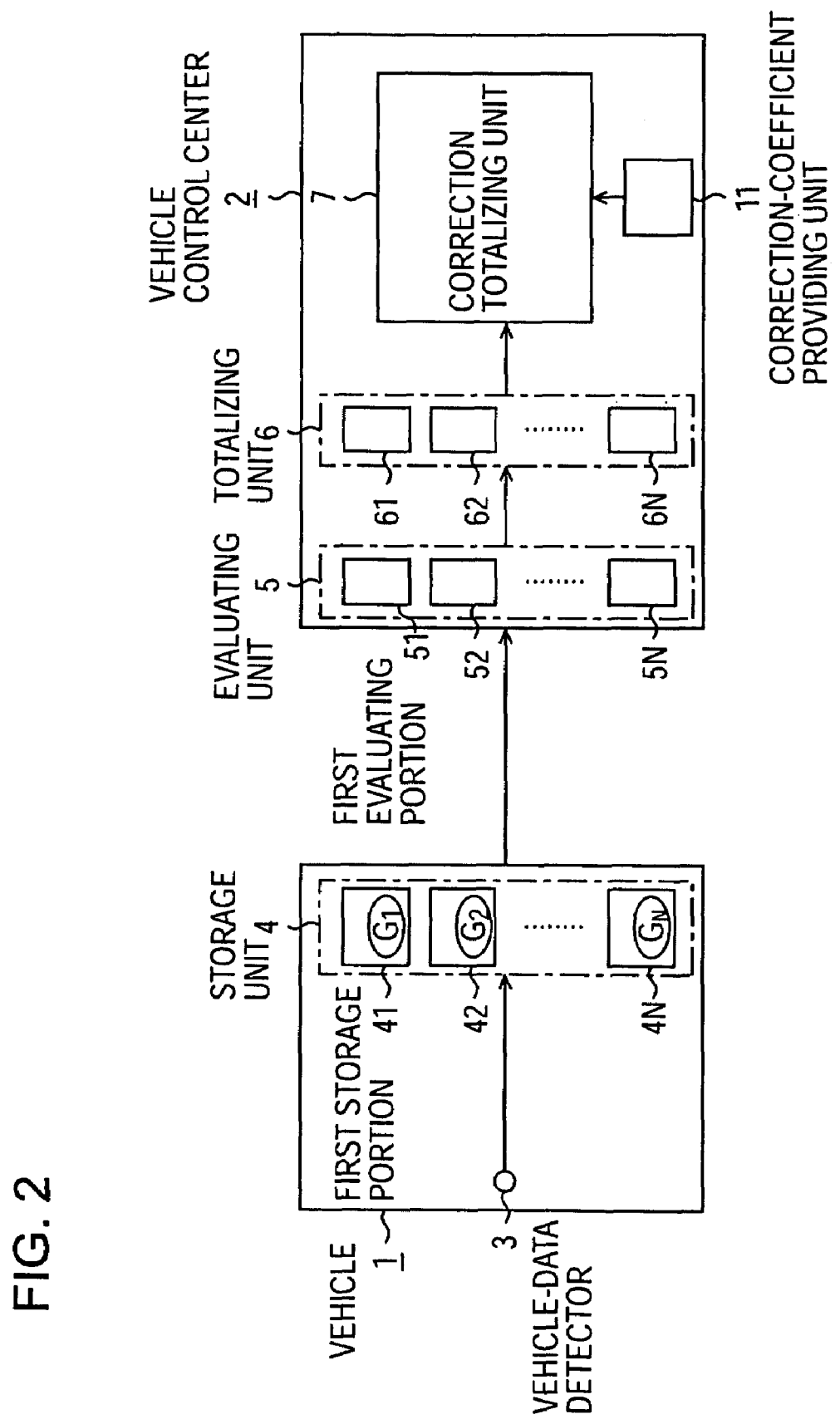
FIG. 2 illustrates a fuel-efficient-driving evaluator according to the first embodiment of the present invention.

FIG. 2 illustrates a fuel-efficient-driving evaluator according to a first embodiment of the present invention. Some reference numerals correspond to those in FIG. 6. Reference numeral 41 indicates a first storage portion, reference numeral 42 indicates a second storage portion, reference numeral 4N indicates an N-th storage portion, reference numeral 51 indicates a first evaluating portion, reference numeral 52 indicates a second evaluating portion, reference numeral 5N indicates an N-th evaluating portion, reference numeral 61 indicates a first totalizing portion, reference numeral 62 indicates a second totalizing portion, reference numeral 6N indicates an N-th totalizing portion, reference numeral 7 indicates a correction totalizing unit, and reference numeral 11 indicates a correction-coefficient providing unit.

Figure 6:
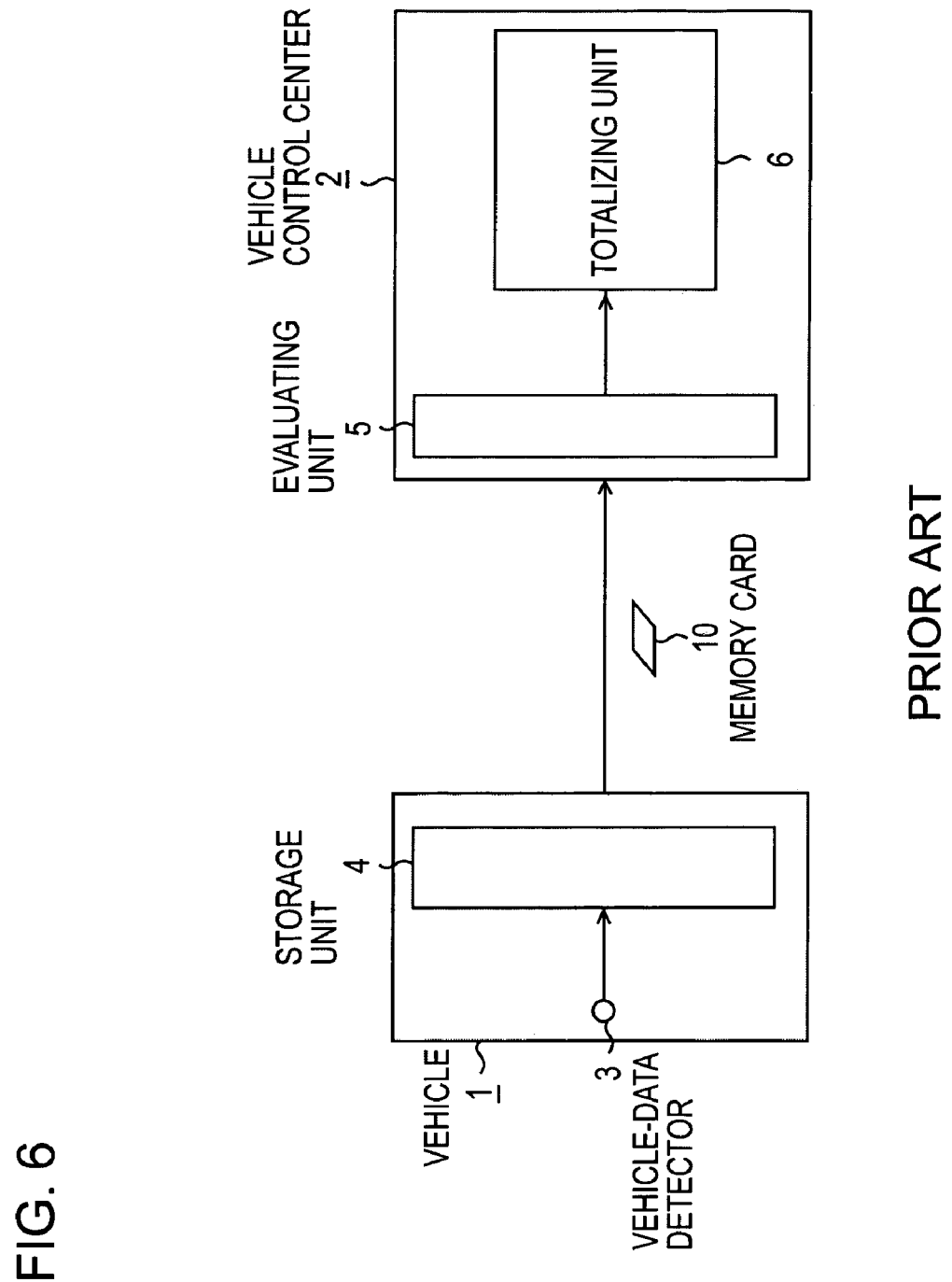
FIG. 6 illustrates an example of a conventional fuel-efficient-driving evaluator.

The components that are given the same reference numerals as those in FIG. 6 are the same components, and the descriptions of such components will thus be omitted. The vehicle-data detector 3 according to the first embodiment can also detect the amount of fuel consumption. Such detection may be performed directly via a fuel gauge or may be based on other vehicle data. Vehicle data may be input to the vehicle control center 2 from the vehicle 1 via a communication network or a storage medium such as a memory card.

In the present invention, for evaluating vehicle data items in view of fuel-efficient driving, different types of (first to N-th) traveling conditions are prepared so as to allow an appropriate evaluation for fuel-efficient driving. Moreover, the final score is determined while taking into consideration which one of the types of traveling conditions each vehicle data item is detected in. The types of traveling conditions may include, for example, "highway driving", "open-road driving", and "idling". Furthermore, the number of types of traveling conditions may be adjusted according to need.

The storage unit 4 includes the first storage portion 41 to the N-th storage portion 4N. The first storage portion 41 stores vehicle data detected in a first traveling condition (for example, highway driving), and the N-th storage portion 4N stores vehicle data detected in an N-th traveling condition (for example, idling).

Similarly, the evaluating unit 5 includes the first evaluating portion 51 to the N-th evaluating portion 5N. The first evaluating portion 51 evaluates the vehicle data corresponding to the first traveling condition, and the N-th evaluating portion 5N evaluates the vehicle data corresponding to the N-th traveling condition. Furthermore, the totalizing unit 6 includes the first totalizing portion 61 to the N-th totalizing portion 6N. The first totalizing portion 61 totalizes the evaluation scores corresponding to the first traveling condition, and the N-th totalizing portion 6N totalizes the evaluation scores corresponding to the N-th traveling condition.

The correction-coefficient providing unit 11 determines the ratio of fuel consumption among the traveling conditions with respect to one trip based on fuel consumption values ($G_1$ to $G_N$) in the corresponding traveling conditions stored in the storage unit 4. The correction-coefficient providing unit 11 sends the rate values of fuel consumption to the correction totalizing unit 7 as correction coefficients.

The correction totalizing unit 7 corrects the total score in each traveling condition based on the corresponding correction coefficient previously sent from the correction-coefficient providing unit 11. The correction totalizing unit 7 then totalizes the total scores so as to determine the final score.

For example, in a case where there are three types of first to third traveling conditions (i.e. highway driving, open-road driving, and idling), the ratio of the fuel consumption among the traveling conditions can be represented as follows:

(first traveling condition):(second traveling condition):(third traveling condition)=$A_1:A_2:A_3$ For example, if the percentages of fuel consumption in a vehicle are as follows: (highway driving)=60%, (open-road driving)=30%, and (idling)=10%, then $A_1$=0.6, $A_2$=0.3, and $A_3$=0.1.

On the other hand, the total score of each of the first totalizing portion to the third totalizing portion is represented as follows:

(total score in first totalizing portion)=$B_1$ (total score in second totalizing portion)=$B_2$ (total score in third totalizing portion)=$B_3$ In this case, the total scores are respectively multiplied by the correction coefficients sent from the correction-coefficient providing unit 11, namely, $A_1$, $A_2$, and $A_3$, so as to correct the total scores. The corrected total scores are then totalized, whereby the final score is derived as follows:

$$\text{(final score)} = A_1 B_1 + A_2 B_2 + A_3 B_3 \tag{1}$$

In comparison to the final score determined based on the conventional approach, the final score determined in the above manner appropriately reflects upon the evaluation for fuel efficiency since the evaluation scores in a traveling condition corresponding to high fuel consumption are treated heavily, whereas the evaluation scores in a traveling condition corresponding to low fuel consumption are treated lightly.

The total scores may be determined in each of the first totalizing portion 61 to the N-th totalizing portion 6N. (for determining, for example, $B_1$) by simply adding the evaluation scores, or may be determined based on other alternative approaches. For example, since the degree of effect upon the fuel consumption may vary depending on the type of vehicle data item (for example, an idle time), the determination of the total scores may be performed while taking into consideration the importance level of such a degree of effect. In detail, an importance-level value for each type of vehicle data item may be preliminarily set in each of the traveling conditions, such that the evaluation score corresponding to each vehicle data item is multiplied by the corresponding importance-level value. In this case, the products are then added to derive the corresponding total score.

FIG. 7 is a diagram illustrating the evaluation scores and the importance-level values with respect to the evaluation parameters for fuel-efficient driving and the traveling conditions. In FIG. 7, reference characters D, E, and F indicate evaluation scores, and each reference character K indicates an importance-level value. Each importance-level value can be determined preliminarily based on, for example, experimental data. Moreover, the importance-level values are set such that, by adding importance-level values in each traveling condition, the sum equals 1. Thus, the following equations hold:

(highway driving) ... $K_{H1}+K_{H2}=1$ (open-road driving) ... $K_{R1}+K_{R2}+K_{R3}+K_{R4}+K_{R5}+K_{R6}=1$ (idling) ... $K_{I1}=1$ Furthermore, the total scores $B_1$, $B_2$, and $B_3$ according to FIG. 7 can be represented as follows:

$B_1=D_1K_{H1}+D_2K_{H2}$ $B_2=E_1K_{R1}+E_2K_{R2}+E_3K_{R3}+E_4K_{R4}+E_5K_{R5}+E_6K_{R6}$ $B_3=F_1K_{I1}$

By substituting the values $B_1$, $B_2$, and $B_3$ in equation (1), the final score can be determined.

Figure 1:
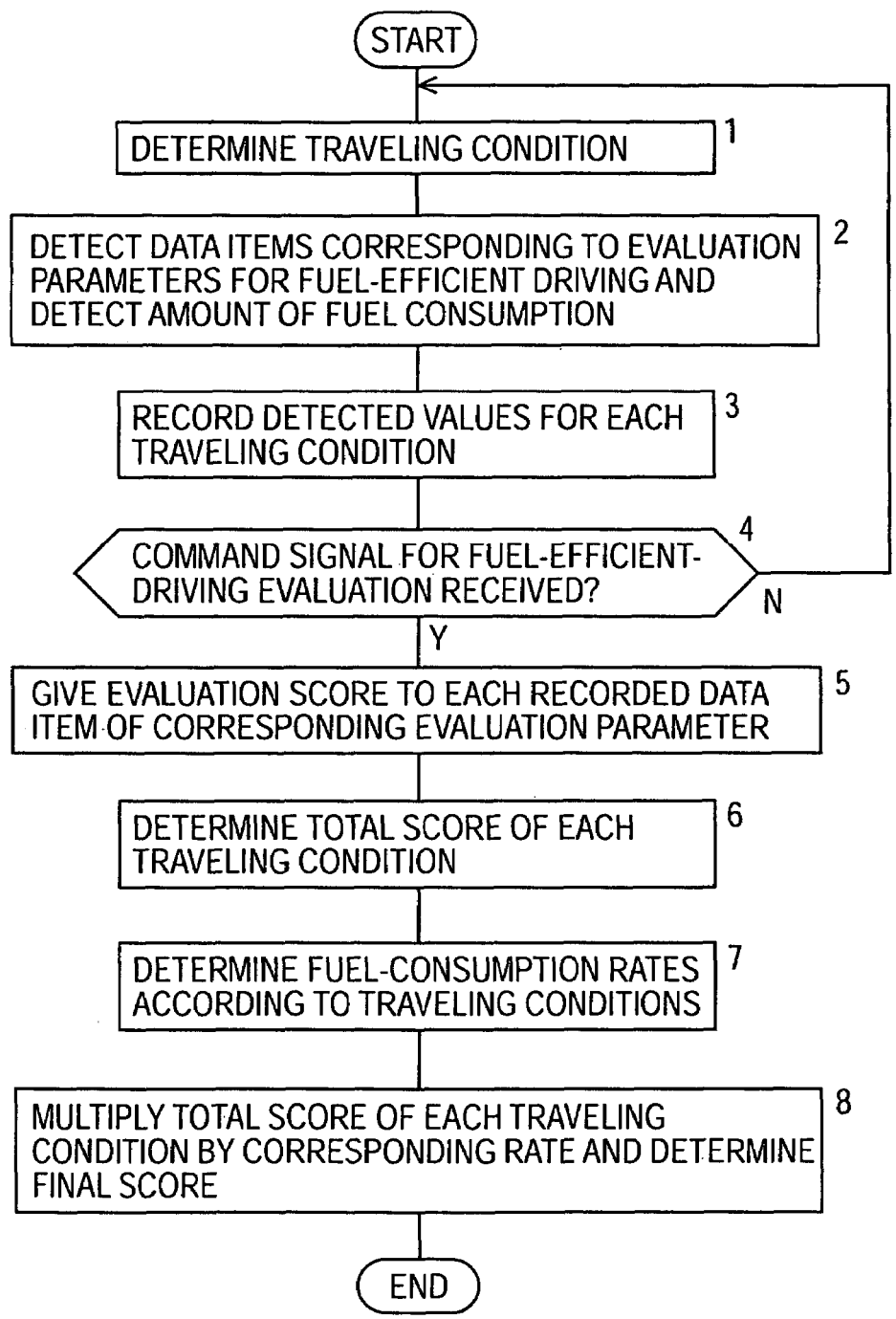
FIG. 1 is a flow chart illustrating the operation according to a first embodiment of the present invention.

FIG. 1 is a flow chart illustrating the operation according to the first embodiment of the present invention.

Step 1 . . . A traveling condition is determined. There are several ways to determine the traveling condition. For example, a predetermined condition may be set for each traveling condition such that a traveling condition may be determined based on whether or not that predetermined condition is satisfied. For example, if a state where more than a predetermined speed (for example, 70 km/h or more) continues for more than a predetermined time (for example, 5 or more minutes), it may be determined that the traveling condition is highway driving. Alternatively, a traveling condition may be determined by receiving a signal including positional data from an external source of the vehicle, such as an ETC (Electronic Toll Collection) or a car navigation system, via an in-vehicle device. As a further alternative, a switch device that generates a determination signal for each traveling condition may be provided, such that the driver may determine one of the traveling conditions and press one of the buttons that corresponds to that determined traveling condition (so as to generate a determination signal).

Step 2 . . . While the evaluation parameters for fuel-efficient driving (for example, the speed of the vehicle, the average engine speed during an upshift, an idle time, and the operation of the gas pedal) are preliminarily selected, data items corresponding to the selected evaluation parameters are detected. At the same time, the amount of fuel consumption is also detected (by direct detection or calculation based on other vehicle data).

Step 3 . . . The detected values of the data items corresponding to the evaluation parameters for fuel-efficient driving are recorded onto the storage unit 4, namely, onto one of the storage portions corresponding to the traveling condition determined in step 1. For example, if the traveling condition determined in step 1 is a first traveling condition, the value detected is recorded onto the first storage portion 41 corresponding to the first traveling condition.

Step 4 . . . It is determined whether a command signal for performing the evaluation for fuel-efficient driving is received. If the command signal is not received, the operation returns to step 1. The setting for generating the command signal may be based on at which point in time the evaluation is desirably performed. For example, if it is desired that the evaluation be performed every time the vehicle stops, an off signal of a key switch may function as the command signal. On the other hand, if it is desired that the evaluation be performed regularly (for example, every weekend or at the end of each month), the command signal may be generated based on clock data.

Step 5 . . . For each traveling condition, an evaluation score is given to each data item of the corresponding evaluation parameter for fuel-efficient driving by the evaluating unit 5 of the vehicle control center 2. For example, the evaluation score for each data item in the first traveling condition is given by the first evaluating portion 51.

Step 6 . . . The evaluation scores given by the corresponding evaluating portion are input to the corresponding totalizing portion where the total score is determined based on an appropriate totalizing approach. For example, the evaluation scores given by the first evaluating portion 51 are input to the corresponding totalizing portion, i.e. the first totalizing portion 61, where the total score is determined. The total score may determined simply by adding the values or by calculation based on predetermined values preliminarily set in view of the degree of effect upon the fuel consumption as shown in FIG. 7.

Step 7 . . . The rates of fuel consumption in the traveling conditions are determined by the correction-coefficient providing unit 11 based on the amount of fuel consumption previously detected for each traveling condition.

Step 8 . . . Each of the determined rates of fuel consumption is multiplied by the total score of the corresponding traveling condition. The products for the traveling conditions are then added together so as to determine the final score.

Second Embodiment

Figure 3:
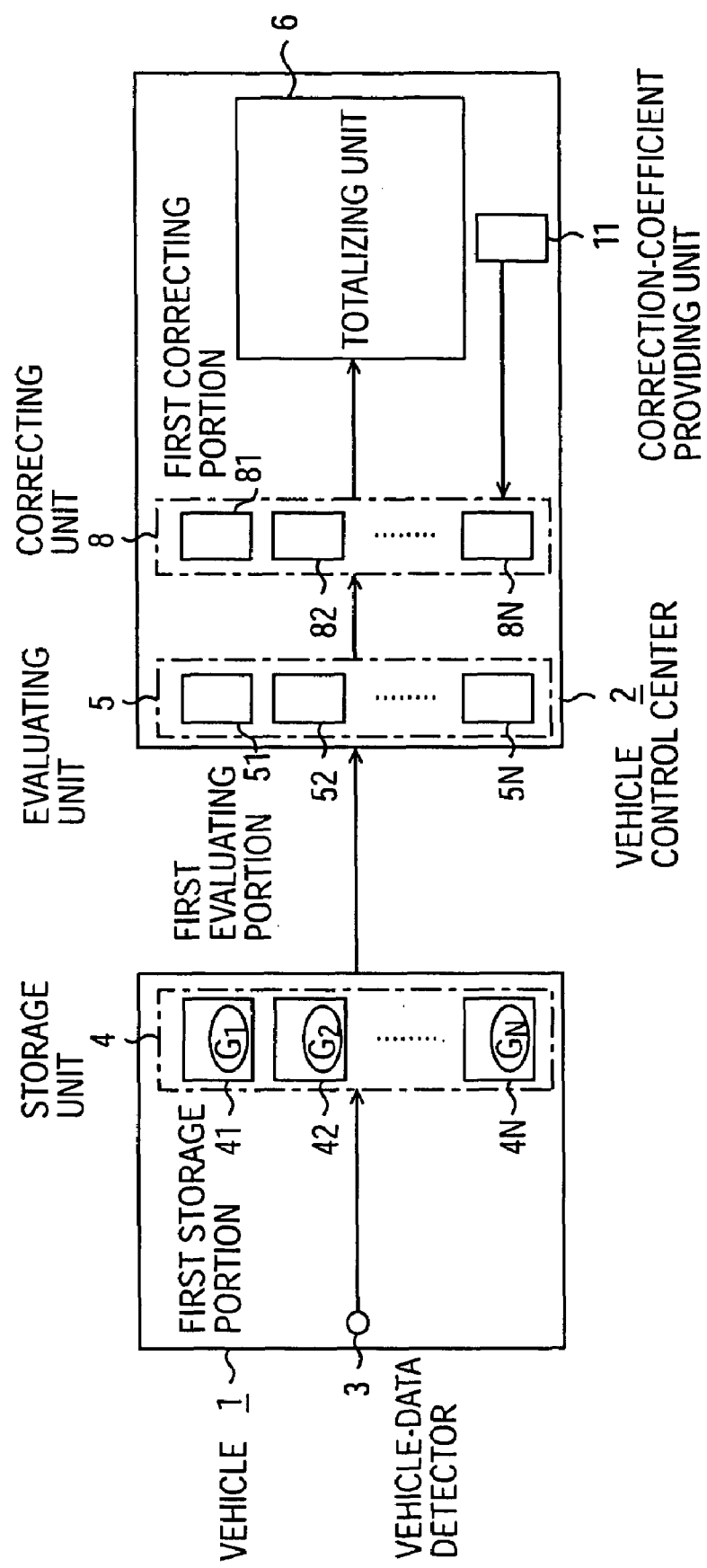
FIG. 3 illustrates the fuel-efficient-driving evaluator according to a second embodiment of the present invention.

FIG. 3 illustrates the fuel-efficient-driving evaluator according to a second embodiment of the present invention. Some reference numerals correspond to those in FIGS. 2 and 6. Reference numeral 81 indicates a first correcting portion, reference numeral 82 indicates a second correcting portion, and reference numeral 8N indicates an N-th correcting portion.

The second embodiment is different from the first embodiment in that the evaluation scores in each traveling condition are corrected before they are totalized. (In the first embodiment, the evaluation scores in each traveling condition are corrected after they are totalized. In other words, the correction process and the totalizing process are performed in an opposite order.) Consequently, a correcting unit 8 is provided in a position following the evaluating unit 5, and the totalizing unit 6 is provided in a position following the correcting unit 8. The correcting unit 8 includes a first correcting portion 81 to an N-th correcting portion 8N which respectively correspond to the first evaluating portion 51 to the N-th evaluating portion 5N in the evaluating unit 5.

The correction coefficients used in the correcting unit 8 are provided by the correction-coefficient providing unit 11.

According to the structure of the second embodiment, the final score can be obtained while taking into consideration the different traveling conditions, as in the first embodiment.

Third Embodiment

Figure 5:
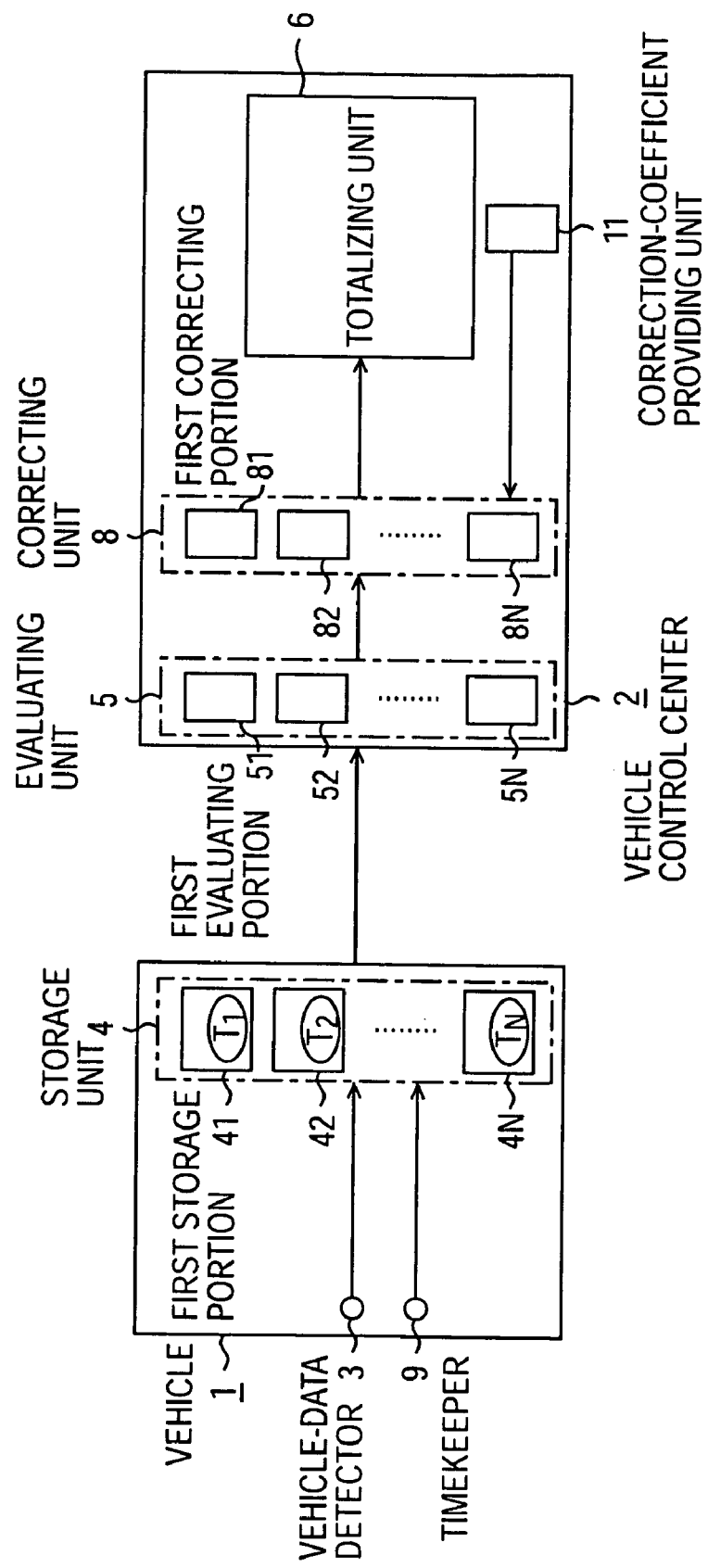
FIG. 5 illustrates the fuel-efficient-driving evaluator according to the third embodiment of the present invention.

FIG. 5 illustrates the fuel-efficient-driving evaluator according to a third embodiment of the present invention. Some reference numerals correspond to those in FIG. 3, and reference numeral 9 indicates a timekeeper. In the third embodiment, instead of detecting the amount of fuel consumption, the time spent in each traveling condition is measured in order to determine the rate of fuel consumption for each traveling condition.

The timekeeper 9 measures the time spent in each of the traveling conditions. The measured time in each traveling condition is recorded individually onto the storage unit 4 (one of $T_1$ to $T_N$). For example, the time spent in the first traveling condition is recorded onto the storage portion corresponding to the first traveling condition, i.e. the first storage portion 41.

To determine the rate of fuel consumption based on the time spent in one of the traveling conditions, the average amount of fuel consumption in the traveling condition (that is, the amount of fuel consumption per unit time period) is preliminarily determined. For example, assuming that the average speed of a vehicle in highway driving is 80 km/h and the average fuel consumption in highway driving is 4 km/L, the average amount of fuel consumption in highway driving is 20 L/h ((80 km/h)÷(4 km/L)=20 L/h). Similarly, the average amounts of fuel consumption for other traveling conditions are preliminarily determined.

Assuming that there are three types of traveling conditions, namely, first to third traveling conditions (for example, highway driving, open-road driving, and idling), the ratio of the average amounts of fuel consumption among the three types can be represented as:

(first traveling condition):(second traveling condition):(third traveling condition)=$C_1$:$C_2$:$C_3$ On the other hand, the time spent in each of the traveling conditions recorded in the corresponding one of the first to third storage portions can be represented as:

(time spent in first traveling condition)=$T_1$ (time spent in second traveling condition)=$T_2$ (time spent in third traveling condition)=$T_3$ Then, the ratio of the amounts of fuel consumption among the traveling conditions (i.e. the fuel-consumption rates) can be determined by the following equation:

(first traveling condition):(second traveling condition):(third traveling condition)=$T_1C_1$:$T_2C_2$:$T_3C_3$ Each of the fuel-consumption rates determined is used as a correction coefficient to be provided by the correction-coefficient providing unit 11. For example, the correction process is performed in a manner such that each evaluation score in the first correcting portion 81 is multiplied by $T_1C_1$, each evaluation score in the second correcting portion 82 is multiplied by $T_2C_2$, and so on.

Figure 4:
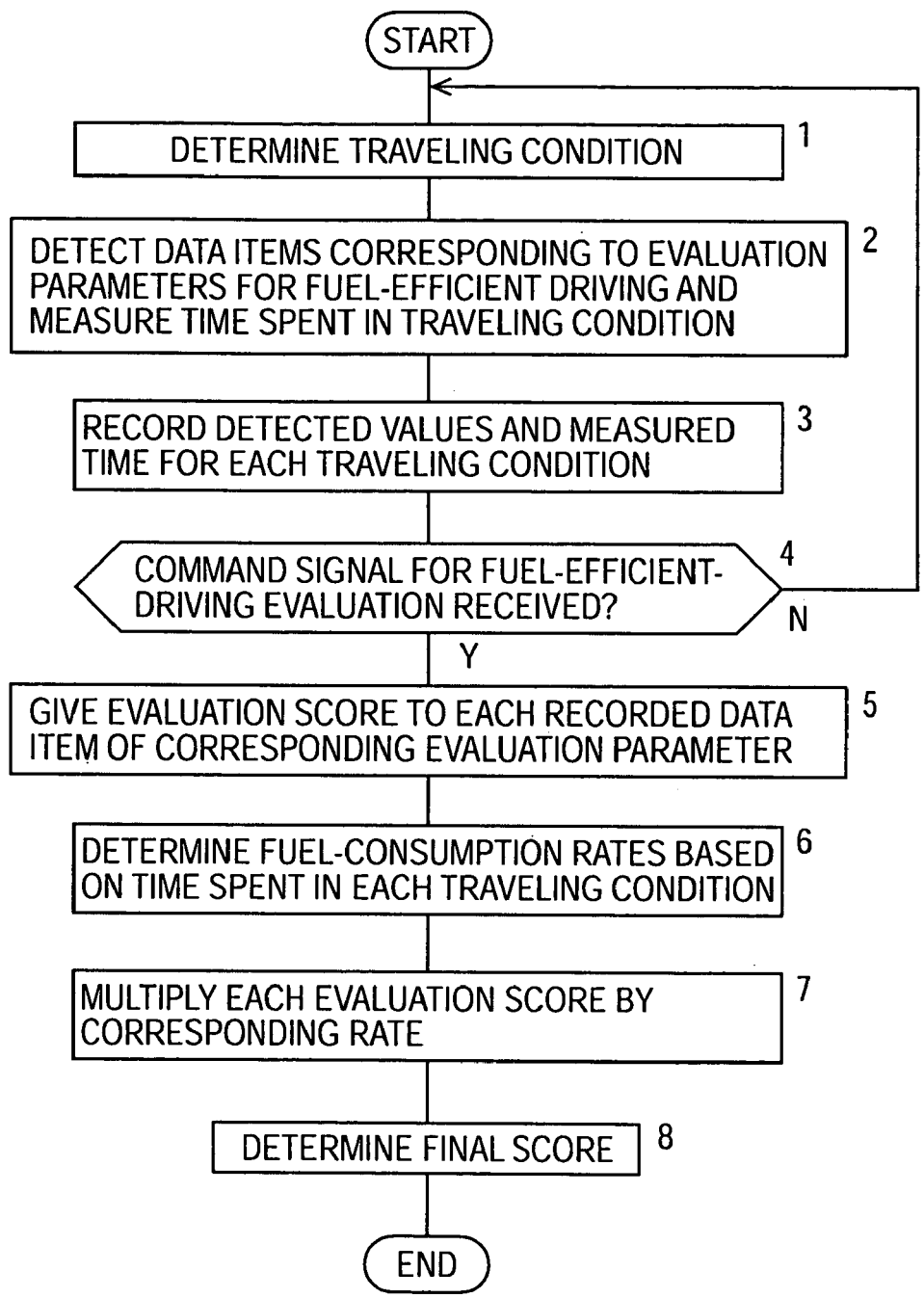
FIG. 4 is a flow chart illustrating the operation according to a third embodiment of the present invention.

FIG. 4 is a flow chart illustrating the operation according to the third embodiment of the present invention.

Step 1 . . . A traveling condition is determined.

Step 2 . . . Data items corresponding to the evaluation parameters for fuel-efficient driving are detected, and moreover, the time spent in the traveling condition (i.e. the traveling condition determined in step 1) is measured.

Step 3 . . . The detected values of the data items and the measured time for the corresponding traveling condition are recorded onto the storage unit 4 (one of $T_1$ to $T_N$).

Step 4 . . . It is determined whether a command signal for performing the evaluation for fuel-efficient driving is received. If the command signal is not received, the operation returns to step 1.

Step 5 . . . If the command signal for performing the evaluation is received, an evaluation score is given to each recorded data item of the corresponding evaluation parameter for fuel-efficient driving by the evaluating unit 5 of the vehicle control center 2 for the corresponding traveling condition.

Step 6 . . . The rates of fuel consumption are determined by the correction-coefficient providing unit 11 based on the time spent in each traveling condition, and each rate is used as a correction coefficient.

Step 7 . . . The evaluation scores given in step 5 in the corresponding traveling condition are corrected in the corresponding correcting portion (one of the first correcting portion 81 to N-th correcting portion 8N). In other words, each evaluation score is multiplied by the corresponding correction coefficient.

Step 8 . . . The corrected evaluation scores are totalized in the totalizing unit 6, whereby the final score is determined.

Although the third embodiment is achieved by additionally providing a timekeeper in the apparatus shown in FIG. 3, the apparatus in FIG. 2 may similarly be provided with a timekeeper for measuring time in order to determine the rates of fuel consumption.

Fourth Embodiment

According to the first to third embodiments, the rates of fuel consumption are determined, and these rates are used as correction coefficients for the correction process. Thus, the evaluation in view of fuel consumption is highly accurate. However, these embodiments require a device for determining the amount of fuel consumption, such as a fuel gauge, which may lead to high cost. In view of these circumstances, although having lower accuracy than the above embodiments, a fourth embodiment provides a lower-cost structure.

In the fourth embodiment, the rate of time spent in each traveling condition is determined, and each rate is used as a correction coefficient for the correction process.

If the time spent in each of the traveling conditions is indicated by a corresponding one of characters $T_1$ to $T_3$, the rates $G_1$ to $G_3$ of time spent in the traveling conditions can be represented by the following equations:

(first traveling condition)=$T_1$ (second traveling condition)=$T_2$ (third traveling condition)=$T_3$ (rate of time spent in first traveling condition):
$G_1 = T_1/(T_1+T_2+T_3)$ (rate of time spent in second traveling condition):
$G_2 = T_2/(T_1+T_2+T_3)$ (rate of time spent in third traveling condition):
$G_3 = T_3/(T_1+T_2+T_3)$ The fourth embodiment has the structure of FIG. 2 but is additionally provided with the timekeeper 9 shown in FIG. 5. Furthermore, the rates $G_1$, $G_2$, and $G_3$ are sent from the correction-coefficient providing unit 11 as correction coefficients (in place of the correction coefficients $A_1$, $A_2$, and $A_3$ in the first embodiment). The fourth embodiment may similarly be applied to the structure of FIG. 3, and in that case, such a structure becomes a modification of the fourth embodiment.

The amount of fuel consumption during an idling operation is much smaller than that during the driving state. However, since the correction process is performed based on the rates of time in the fourth embodiment, the correction for the idling operation based on the corresponding rate of time spent is relatively large in comparison with that for open-road driving and highway driving. This may be problematic in view of lower accuracy of evaluation.

Even so, performing the correction process based on the rates $G_1$, $G_2$, and $G_3$ will still lead to higher accuracy of evaluation than not performing the correction process at all.

Fifth Embodiment

Similarly, the fifth embodiment has lower accuracy but provides a lower-cost structure. In the fifth embodiment, the rate of distance traveled in each traveling condition is determined, and each rate is used as a correction coefficient for the correction process.

If the distance traveled in each traveling condition is indicated by a corresponding one of characters $L_1$ to $L_3$, the rates $H_1$, $H_2$, and $H_3$ of distances traveled in the traveling conditions can be represented by the following equations:

(first traveling condition)=$L_1$ (second traveling condition)=$L_2$ (third traveling condition)=$L_3$ (rate of distance traveled in first traveling condition): $H_1=L_1/(L_1+L_2+L_3)$ (rate of distance traveled in second traveling condition): $H_2=L_2/(L_1+L_2+L_3)$ (rate of distance traveled in third traveling condition): $H_3=L_3/(L_1+L_2+L_3)$ The fifth embodiment has the structure of FIG. 2 in which the rates $H_1$, $H_2$, and $H_3$ are sent from the correction-coefficient providing unit 11 as correction coefficients (in place of the correction coefficients $A_1$, $A_2$, and $A_3$ in the first embodiment).

The fifth embodiment may similarly be applied to the structure of FIG. 3, and in that case, such a structure becomes a modification of the fifth embodiment.

Assuming that the third traveling condition is an idling operation, since a vehicle is not driven during an idling operation, $L_3=0$. Consequently, $H_3=0$. For this reason, the evaluation in view of fuel consumption that includes the condition of an idling operation cannot actually be performed, thus leading to lower accuracy. Even so, performing the correction process based on the rates $H_1$, $H_2$, and $H_3$ will still lead to higher accuracy of evaluation than not performing the correction process at all.

The invention claimed is:

1. A fuel-efficient-driving evaluator comprising a vehicle-data detector for detecting vehicle data items corresponding to evaluation parameters for fuel-efficient driving; a storage unit for storing the vehicle data items; an evaluating unit for evaluating each stored vehicle data item in view of fuel-efficient driving so as to give an evaluation score to the vehicle data item; and a totalizing unit for totalizing the evaluation scores in order to determine total scores,
   wherein the storage unit, the evaluating unit, and the totalizing unit respectively includes first to N-th storage portions, first to N-th evaluating portions, and first to N-th totalizing portions corresponding to first to N-th preliminarily-set traveling conditions,
   wherein the fuel-efficient-driving evaluator further comprises:
      a correction-coefficient providing unit which determines rates of fuel consumption based on the amounts of fuel consumed in the first to N-th traveling conditions and sends the rates as correction coefficients; and
      a correction totalizing unit which corrects each of the total scores determined by a corresponding one of the first to N-th totalizing portions based on the corresponding correction coefficient and determines a final score.

2. A fuel-efficient-driving evaluator comprising a vehicle-data detector for detecting vehicle data items corresponding to evaluation parameters for fuel-efficient driving; a storage unit for storing the vehicle data items; an evaluating unit for evaluating each stored vehicle data item in view of fuel-efficient driving so as to give an evaluation score to the vehicle data item; and a totalizing unit for totalizing the evaluation scores in order to determine total scores,
   wherein the storage unit and the evaluating unit respectively includes first to N-th storage portions and first to N-th evaluating portions corresponding to first to N-th preliminarily-set traveling conditions,
   wherein the fuel-efficient-driving evaluator further comprises:
      a correction-coefficient providing unit which determines rates of fuel consumption based on the amounts of fuel consumed in the first to N-th traveling conditions and sends the rates as correction coefficients;
      a correcting unit including first to N-th correcting portions respectively corresponding to the first to N-th preliminarily-set traveling conditions, each of the first to N-th correcting portions of the correcting unit correcting the evaluation scores received from the corresponding evaluating portion based on the corresponding one of the correction coefficients; and
      a totalizing unit for totalizing the evaluation scores obtained in the first to N-th correcting portions to determine a final score.

3. The fuel-efficient-driving evaluator according to claim 1, further comprising a timekeeper for measuring the time spent in each of the first to N-th preliminarily-set traveling conditions, the measured time being stored in the storage unit,
   wherein each of the rates of fuel consumption determined by the correction-coefficient providing unit is determined based on the time spent in the corresponding one of the first to N-th traveling conditions.

4. A method for evaluating fuel-efficient driving by detecting and recording vehicle data items corresponding to evaluation parameters for fuel-efficient driving, giving each of the vehicle data items an evaluation score in view of fuel-efficient driving, and totalizing the evaluation scores so as to determine a final score, the method comprising the steps of:
   determining which one of first to N-th preliminarily-set traveling conditions a current traveling condition belongs to;
   recording the detected vehicle data items and an amount of fuel consumption for the corresponding one of the first to N-th traveling conditions; and
   correcting the evaluation score of each of the recorded vehicle data items in the corresponding one of the first to N-th traveling conditions based on a rate of fuel consumption for the corresponding one of the first to N-th traveling conditions.

5. A fuel-efficient-driving evaluator comprising a vehicle-data detector for detecting vehicle data items corresponding to evaluation parameters for fuel-efficient driving; a storage unit for storing the vehicle data items; an evaluating unit for evaluating each stored vehicle data item in view of fuel-efficient driving so as to give an evaluation score to the vehicle data item; and a totalizing unit for totalizing the evaluation scores in order to determine total scores,
   wherein the storage unit, the evaluating unit, and the totalizing unit respectively includes first to N-th storage portions, first to N-th evaluating portions, and first to N-th totalizing portions corresponding to first to N-th preliminarily-set traveling conditions,
   wherein the fuel-efficient-driving evaluator further comprises:
      a correction-coefficient providing unit which determines each rate of spent time based on the time spent in a corresponding one of the first to N-th traveling conditions and sends each of the rates as a correction coefficient; and
      a correction totalizing unit which corrects each of the total scores determined by a corresponding one of the first to N-th totalizing portions based on the corresponding correction coefficient and determines a final score.

6. A fuel-efficient-driving evaluator comprising a vehicle-data detector for detecting vehicle data items corresponding to evaluation parameters for fuel-efficient driving; a storage unit for storing the vehicle data items; an evaluating unit for evaluating each stored vehicle data item in view of fuel-efficient driving so as to give an evaluation score to the vehicle data item; and a totalizing unit for totalizing the evaluation scores in order to determine a final score, wherein the storage unit and the evaluating unit respectively includes first to N-th storage portions and first to N-th evaluating portions corresponding to first to N-th preliminarily-set traveling conditions, wherein the fuel-efficient-driving evaluator further comprises:

a correction-coefficient providing unit which determines each rate of spent time based on the time spent in a corresponding one of the first to N-th traveling conditions and sends each of the rates as a correction coefficient;

a correcting unit including first to N-th correcting portions respectively corresponding to the first to N-th preliminarily-set traveling conditions, each of the first to N-th correcting portions of the correcting unit correcting the evaluation scores received from the corresponding evaluating portion based on the corresponding one of the correction coefficients; and a totalizing unit for totalizing the evaluation scores obtained in the first to N-th correcting portions to determine the final score.

7. A method for evaluating fuel-efficient driving by detecting and recording vehicle data items corresponding to evaluation parameters for fuel-efficient driving, giving each of the vehicle data items an evaluation score in view of fuel-efficient driving, and totalizing the evaluation scores so as to determine a final score, the method comprising the steps of:

determining which one of first to N-th preliminarily-set traveling conditions a current traveling condition belongs to;

recording the detected vehicle data items and the time spent for the corresponding one of the first to N-th traveling conditions; and correcting the evaluation score of each of the recorded vehicle data items in the corresponding one of the first to N-th traveling conditions based on a rate of time spent for the corresponding one of the first to N-th traveling conditions.

8. A fuel-efficient-driving evaluator comprising a vehicle-data detector for detecting vehicle data items corresponding to evaluation parameters for fuel-efficient driving; a storage unit for storing the vehicle data items; an evaluating unit for evaluating each stored vehicle data item in view of fuel-efficient driving so as to give an evaluation score to the vehicle data item; and a totalizing unit for totalizing the evaluation scores in order to determine total scores, wherein the storage unit, the evaluating unit, and the totalizing unit respectively includes first to N-th storage portions, first to N-th evaluating portions, and first to N-th totalizing portions corresponding to first to N-th preliminarily-set traveling conditions, wherein the fuel-efficient-driving evaluator further comprises:

a correction-coefficient providing unit which determines each rate of traveled distance based on the distance traveled in a corresponding one of the first to N-th traveling conditions and sends each of the rates as a correction coefficient; and a correction totalizing unit which corrects each of the total scores determined by a corresponding one of the first to N-th totalizing portions based on the corresponding correction coefficient and determines a final score.

9. A fuel-efficient-driving evaluator comprising a vehicle-data detector for detecting vehicle data items corresponding to evaluation parameters for fuel-efficient driving; a storage unit for storing the vehicle data items; an evaluating unit for evaluating each stored vehicle data item in view of fuel-efficient driving so as to give an evaluation score to the vehicle data item; and a totalizing unit for totalizing the evaluation scores in order to determine a final score, wherein the storage unit and the evaluating unit respectively includes first to N-th storage portions and first to N-th evaluating portions corresponding to first to N-th preliminarily-set traveling conditions, wherein the fuel-efficient-driving evaluator further comprises:

a correction-coefficient providing unit which determines each rate of traveled distance based on the distance traveled in a corresponding one of the first to N-th traveling conditions and sends each of the rates as a correction coefficient;

a correcting unit including first to N-th correcting portions respectively corresponding to the first to N-th preliminarily-set traveling conditions, each of the first to N-th correcting portions of the correcting unit correcting the evaluation scores received from the corresponding evaluating portion based on the corresponding one of the correction coefficients; and a totalizing unit for totalizing the evaluation scores obtained in the first to N-th correcting portions to determine the final score.

10. A method for evaluating fuel-efficient driving by detecting and recording vehicle data items corresponding to evaluation parameters for fuel-efficient driving, giving each of the vehicle data items an evaluation score in view of fuel-efficient driving, and totalizing the evaluation scores so as to determine a final score, the method comprising the steps of:

determining which one of first to N-th preliminarily-set traveling conditions a current traveling condition belongs to;

recording the detected vehicle data items and a traveled distance for the corresponding one of the first to N-th traveling conditions; and correcting the evaluation score of each of the recorded vehicle data items in the corresponding one of the first to N-th traveling conditions based on a rate of distance traveled in the corresponding one of the first to N-th traveling conditions.

11. The fuel-efficient-driving evaluator according to claim 2, further comprising a timekeeper for measuring the time spent in each of the first to N-th preliminarily-set traveling conditions, the measured time being stored in the storage unit, wherein each of the rates of fuel consumption determined by the correction-coefficient providing unit is determined based on the time spent in the corresponding one of the first to N-th traveling conditions.

* * * * *